United States Patent Office 3,133,087
Patented May 12, 1964

3,133,087
TETRAALKENYL-1,4-DIOXANES
Robert Arnold Braun, Newark, Del., assignor to E. I. du Pont de Nemours and Company, Wilmington, Del., a corporation of Delaware
No Drawing. Filed May 10, 1961, Ser. No. 109,000
6 Claims. (Cl. 260—340.6)

This invention relates to new chemical compounds, and more particularly to new unsaturated 1,4-dioxanes and coating compositions thereof.

Conventional coating compositions presently in commercial use usually contain high molecular weight polymers as the principal film-forming materials. In order that such coating compositions be sufficiently fluid to be applied, the polymers are either dissolved in a solvent or dispersed in a non-solvent, usually water. To be sufficiently fluid for conventional application procedures, such solution coating compositions generally contain on the order of 10 to 30% by weight solids while aqueous dispersion coating compositions usually contain about 30 to 50% by weight solids. Such conventional coating compositions thus have the obvious disadvantage of containing a large portion of solvent or non-solvent vehicle which must be blended, packaged, shipped, stored and applied, but does not form a portion of dry coatings thereof.

Conventional coating compositions are often baked to develop full properties in dried films thereof such as solvent resistance and hardness. Other coating compositions, such as lacquers, dry at room temperature by evaporation of solvent; however, evaporation of solvent does not substantially change them chemically. Thus, such compositions are often susceptible to solvents for the starting materials. Still other coating compositions, for example, those containing alkyd resins and the like, air dry at room temperature, that is, on exposure to the air at room temperature they become insoluble in solvents for the starting materials therefor. This air-drying reaction improves, for example, hardness and solvent resistance in the dried films. Unfortunately, however, most common air-drying coating compositions require a relatively long period of time to reach the air-dried state.

For the foregoing reasons, in recent years considerable effort has been made toward trying to find film-forming materials which can be formulated into coating compositions containing little or no solvent and which can be converted rapidly into insoluble films and coatings with mild, and preferably no baking.

The subject invention provides a new class of chemical compounds which are fluid at room temperature and which can be formulated into coating compositions containing 100% of solids (or materials which become solid). Coating compositions formulated from the compounds of this invention require at most only mild baking; the preferred compounds air dry rapidly at room temperature.

The compounds of this invention have the structural formula:

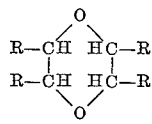

wherein R is an alpha,beta-monoolefinic hydrocarbon radical of 2 to 8 carbon atoms bearing at least one hydrogen atom bonded to the beta carbon atom. Compounds in which R bears two beta hydrogen atoms, that is, where R is a vinyl or alpha-substituted vinyl radical, particularly those in which the alpha carbon bears hydrogen or $C_1$ to $C_6$ alkyl substituents are preferred because they are easily prepared from readily available materials and because they have the most marked air-drying properties. Compounds in which R is vinyl, that is, those wherein R contains two carbon atoms, are particularly preferred because they can be prepared most readily, because they are highly reactive and particularly have the most rapid and marked air-drying properties, and because they are very fluid at room temperature. In the aforementioned compounds, the R's can be the same or different.

Illustrative compounds of this invention are:
2,3,5,6-tetravinyl-1,4-dioxane,
2,3,5,6-tetraisopropenyl-1,4-dioxane,
2,3,5,6-tetra(alpha-ethylvinyl)-1,4-dioxane,
2,3,5,6-tetra(alpha-butylvinyl)-1,4-dioxane,
2,3,5,6-tetra(alpha-hexylvinyl)-1,4-dioxane,
2,3,5,6-tetra(alpha-methylprop-1-enyl)-1,4-dioxane,
2,3,5,6-tetra(but-1-enyl)-1,4-dioxane,
2,3,5,6-tetra(hex-1-enyl)-1,4-dioxane,
2,3,5,6-tetra(alpha-phenylvinyl)-1,4-dioxane,
2,3,5,6-tetra(beta-phenylvinyl)-1,4-dioxane,
2,3-diisopropenyl-5,6-divinyl-1,4-dioxane,
2,5-diisopropenyl-3,6-divinyl-1,4-dioxane,
2,3-di(alpha-isopropylvinyl)-5,6-divinyl-1,4-dioxane, and
2-isopropenyl-3,5,6-trivinyl-1,4-dioxane.

The compounds of this invention are prepared by the process which comprises heating diolefinic ethylene glycol having the formula:

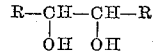

wherein R has the meaning specified hereinbefore, in the presence of a mild dehydrating agent or catalyst and a vinyl polymerization inhibitor at a temperature of less than about 150° C., and preferably 115 to 130° C., and, during the reaction, continuously removing water from the reaction mixture. The reaction is normally continued until water is no longer evolved from the reaction mixture, usually for about 1 to 3 hours. Diolefinic ethylene glycols which can be used in the process of this invention and a method by which they can be prepared are shown in copending application Serial No. 41,779, filed by R. A. Braun on July 11, 1960. Such glycols include, for example divinyl ethylene glycol, diisopropenyl ethylene glycol, di(alpha-isopropylvinyl) ethylene glycol, di(alpha-butylvinyl) ethylene glycol, diprop-1-enyl ethylene glycol, di(alpha-phenylvinyl) ethylene glycol, di(beta-phenylvinyl) ethylene glycol, dipent-1-enyl ethylene glycol, dihex-1-enyl ethylene glycol, di(alpha-methylprop-1-enyl) ethylene glycol, vinyl isopropenyl ethylene glycol and mixtures thereof.

Usually, about from 0.1 to 10%, and preferably about from 1 to 5% of catalyst, based on the weight of glycol, is used. Cupric chloride is a particularly preferred catalyst although mercurous and mercuric sulfates, oxides, nitrates, chlorides and acetates can be employed.

In order to prevent undue vinyl polymerization during the preparation of the compounds of this invention, inhibitors such as hydroquinone, catachol, beta-naphthyl amine, di-beta-naphthyl amine and phenothiazine are added to the reaction mixture. Phenothiazine and hydroquinone are particularly preferred. Anywhere from about 0.1 to 25% by weight of inhibitor based on the weight of glycol can be employed.

Low molecular weight products, particularly, 2,3,5,6-tetravinyl - 1,4 - dioxane, are usually prepared at atmospheric pressure at temperatures of about 100 to 150° C., and preferably 115 to 130° C. Water is continuously removed from the reaction mixture during the reaction. With higher molecular weight products, it is often desirable to run the reaction at reduced pressure in order to facilitate removal of the water and drive the reaction to completion. Although higher temperatures are normally preferred in order to facilitate reaction, such high temperatures may also promote vinyl polymerization; thus, it is often desirable to run the aforementioned reaction at temperatures approaching 100° C. or even at lower temperatures in combination with reduced pressures. Of course, to insure removal of the water by-product, the reaction should be run above the boiling point of water at the particular reaction pressure employed.

The products of this invention can be purified in the conventional manner. Normally, the reaction mixture is fractionated under reduced pressure.

Compounds of this invention can be used per se as coating compositions. Usually, they are blended with metallic driers which catalyze the drying reaction; thus, one or more compounds of this invention can be merely blended with such driers such as, for example, lead, manganese, zinc, iron, nickel, cadmium, copper, tin, zirconium, and preferably cobalt salts. Such salts include, for example, the acetates, naphthenates, linoleates, resinates, tallates, oxalates and phthalates of the aforementioned metals. Cobalt partial esters of dicarboxylic acids such as the $C_1$ to $C_{18}$ alkyl acid phthalates, malonates, succinates, adipates and sebacates are particularly preferred. Usually about from 0.005 to 3% and preferably 0.01% to 1.0% of metal based on the weight of dioxane is employed.

If desired, other conventional additives also can be added to such compositions. These additives include, for example, pigments and extenders such as metal oxides, hydroxides, chromates, silicates, sulfides, sulfates, carbonates, organic dyes and lakes thereof and metal flake pigments which can be blended therewith in conventional amounts. Other compatible film-forming materials such as homopolymers and copolymers of acrylic esters, vinyl acetate and styrene; alkyd resins; copolymers of butadiene and acrylonitrile and copolymers of acrylonitrile and acrylic esters, together with solvent, also can be blended with the compounds of this invention in coating compositions.

As noted hereinbefore, coating compositions prepared from the compounds of this invention can contain little or no solvent; however, in certain cases, for example, when other polymeric film-forming materials are added thereto, it may be desirable to add solvents such as, for example, toluene, xylene, benzene, butyl acetate, methyl isobutyl ketone, butyl ether and other aliphatic, cycloaliphatic and aromatic hydrocarbons, esters, ethers, ketones and alcohols. Other conventional materials such as plasticizers, inhibitors, flow-control agents and the like can also be added in conventional amounts to the compositions of this invention.

Coating compositions prepared from the compounds of this invention dry rapidly. Where maximum adhesion and outdoor weatherability is desired, and particularly with the higher molecular weight compounds of this invention, mild baking, for example, at temperatures of 50 to 100° C. for 1 to 4 hours is sometimes preferred. In many cases, however, especially with the particularly preferred compounds of this invention, air drying at room temperature for 10 hours or less is satisfactory.

The compounds of this invention can be formulated into solvent-free coating compositions; thus, with the compositions of this invention, thick solvent-free coatings can be applied, even sprayed, in one, or at most a few passes. The products of this invention have excellent adhesion, for example, to wood and metal substrates. Dried coatings of coating compositions formulated with the compounds of this invention are hard, glossy, solvent-resistant and show good weatherability.

Because of their polyolefinic functionality, the compounds of this invention also are useful, for example, as cross-linking agent for polymers, for example, in copolymers of the compounds of this invention and, for example, natural drying oils, triallyl cyanurate, styrene, acrylonitrile, acrylic esters, ethylenically unsaturated alkyd resins and vinyl acetate.

In the following examples which illustrate this invention, parts and percentages are by weight unless otherwise indicated.

Examples

A mixture of 57 parts of divinyl ethylene glycol (0.5 mole), 2 parts of cupric chloride dihydrate and 10 parts of hydroquinone is heated with stirring at 110 to 120° C. for 30 minutes, then heated for an additional 60 minutes at about 130° C. During the reaction, 5.6 parts of water are distilled from the reaction mixture. The reaction mixture is cooled and filtered, then the filtrate is distilled under reduced pressure to yield 21.5 parts of crude 2,3,5,6-tetravinyl-1,4-dioxane boiling at a temperature of 53° C. at a pressure of 0.2 millimeter of mercury absolute and containing a small portion of divinyl ethylene glycol. Next, the distillate is washed twice with cold water, dried over magnesium sulfate and fractionated to give purified 2,3,5,6-tetravinyl-1,4-dioxane boiling at a temperature of 80 to 82° C. at a pressure of 1.25 millimeters of mercury absolute. The above purified product, which is a fluid liquid at room temperature shows the following analysis:

|  | Calculated | Found |
|---|---|---|
| Carbon, percent | 74.96 | 74.02 |
| Hydrogen, percent | 8.39 | 8.34 |
| Molecular weight (ebullioscopic) | 192 | 204 |
| C=C, g. H$_2$/g. sample | 0.0417 | 0.0422, 0.0413 |

The infra-red spectrum of the above product shows no absorption in the OH region, absorption caused olefinic unsaturation at the 6.12 and 6.28 micron bands and strong absorption at about 9.12 microns caused by the C—O—C bond. In relating 2,3,5,6-tetravinyl-1,4-dioxane to the aforementioned formula, R is —CH=CH$_2$.

A coating composition is prepared by blending cobalt butyl phthalate drier (0.05% Co$^{+2}$) with 100 parts of the above 2,3,5,6-tetravinyl-1,4-dioxane. The resulting composition, after it is coated onto panels, dries to a tack-free, solvent-resistant state in about 5 to 6 hours at room temperature. The composition is sufficiently fluid without solvent so that it can be sprayed.

Adhesion of the above composition to steel is excellent as shown by conventional knife and impact tests. Similar excellent adhesion is obtained when the composition is applied to maple panels. Substrates coated with the above composition have good outdoor weatherability. Adhesion after weathering, particularly over metal substrates can be sometimes enhanced by mild baking, for example, for one hour at 100° C. although for many uses this is not necessary.

2,3,5,6-tetraprop-1-enyl-1,4-dioxane and 2,3,5,6-tetraisopropenyl-1,4-dioxane can be prepared by the general procedure and under the general conditions shown above. In this case, however, the starting materials are diprop-1-enyl ethylene glycol and diisopropenyl ethylene glycol, respectively, instead of the divinyl ethylene glycol employed above. Likewise, other diolefinic ethylene glycols mentioned hereinbefore can be employed using the aforementioned general procedure and conditions to yield compounds of this invention. In each particular case, the specific reaction conditions are varied, either by varying the reaction temperature or by reducing the reaction pressure or both, in order to obtain the optimum balance of minimum reaction time and maximum yield.

I claim:
1. 2,3,5,6-tetravinyl-1,4-dioxane.
2. A compound having the formula

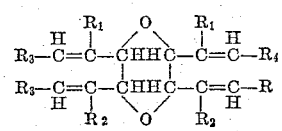

where $R_1$, $R_2$, $R_3$ and $R_4$ are selected from the group consisting of hydrogen, alkyl of 1 through 6 carbon atoms and phenyl.

3. A compound according to claim 2 wherein $R_1$ and $R_2$ are alkyl of 1 through 6 carbon atoms, and $R_3$ and $R_4$ are hydrogen.

4. A compound according to claim 2 wherein $R_1$ and $R_2$ are hydrogen, and $R_3$ and $R_4$ are alkyl of 1 through 6 carbon atoms.

5. A compound according to claim 2 wherein $R_1$ and $R_2$ are alkyl of 1 through 6 carbon atoms, and $R_3$ and $R_4$ are phenyl.

6. A compound according to claim 2 wherein $R_1$ and $R_2$ are phenyl, and $R_3$ and $R_4$ are alkyl of 1 through 6 carbon atoms.

References Cited in the file of this patent

UNITED STATES PATENTS

| | | |
|---|---|---|
| 2,840,486 | Hunter | June 24, 1958 |
| 2,856,310 | Weisgerber | Oct. 14, 1958 |
| 2,911,445 | Friederich | Nov. 3, 1959 |
| 2,912,439 | Hasek et al. | Nov. 10, 1959 |

UNITED STATES PATENT OFFICE
CERTIFICATE OF CORRECTION

Patent No. 3,133,087                          May 12, 1964

Robert Arnold Braun

It is hereby certified that error appears in the above numbered patent requiring correction and that the said Letters Patent should read as corrected below.

Column 4, lines 70 to 75, the formula should appear as shown below instead of as in the patent:

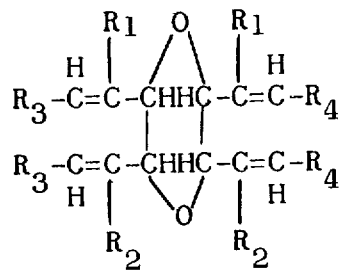

Signed and sealed this 15th day of September 1964.

(SEAL)
Attest:

ERNEST W. SWIDER                                 EDWARD J. BRENNER
Attesting Officer                                  Commissioner of Patents